United States Patent [19]

Newton et al.

[11] 4,160,498
[45] Jul. 10, 1979

[54] ELECTROMAGNETIC COUPLING

[75] Inventors: Paul P. Newton, Beloit; Robert A. Olsen, Janesville, both of Wis.

[73] Assignee: Warner Electric Brake & Clutch Company, South Beloit, Ill.

[21] Appl. No.: 860,582

[22] Filed: Dec. 14, 1977

[51] Int. Cl.² .............................................. F16D 27/10
[52] U.S. Cl. .................................................. 192/84 C
[58] Field of Search .......................... 192/84 A, 84 C

[56] References Cited

U.S. PATENT DOCUMENTS

| 2,729,318 | 1/1956 | Harter | 192/84 C |
| 2,796,962 | 6/1957 | Pierce | 192/84 C |
| 2,975,648 | 3/1961 | Doerries | 74/377 |
| 3,300,008 | 1/1967 | Mendenhall | 192/84 |
| 3,384,213 | 5/1968 | Bernard et al. | 192/84 C |
| 3,703,227 | 11/1972 | Murakami | 192/84 C |
| 3,712,439 | 1/1973 | Schacher et al. | 192/84 C |

FOREIGN PATENT DOCUMENTS 268790   2/1969   Austria ................. 192/84 C

Primary Examiner—Allan D. Herrmann
Attorney, Agent, or Firm—Leydig, Voit, Osann, Mayer & Holt, Ltd.

[57] ABSTRACT

The magnet core of an electromagnetic clutch is substantially J-shaped in radial cross-section and includes an outer pole ring which is spaced radially outwardly from and which only partially surrounds the outer pole ring of the rotor of the clutch. The controlled transfer of flux between the core and the rotor occurs both in a radial direction and in an axial direction.

6 Claims, 2 Drawing Figures

ELECTROMAGNETIC COUPLING

BACKGROUND OF THE INVENTION

This invention relates to an electromagnetic coupling such as an electromagnetic clutch of the type having a stationary magnet core, a rotor and a relatively rotatable armature. The magnet core and the rotor are both defined by inner and outer radially spaced pole rings with the rings of the core being spaced from the rings of the rotor by radial air gaps of precise narrow width. A multiple turn winding is disposed between the core and the rotor and, when energized, produces magnetic flux which threads across the air gaps and draws the armature toward pole faces defined by the ends of the rings of the rotor. The armature thus is coupled to the rotor and rotates in unison with the rotor. The coupling torque is dependent in part upon the amount of controlled flux which is effectively transferred across the air gaps between the rotor and the magnet core.

A clutch of this general type is disclosed in Pierce U.S. Pat. No. 2,796,962. In that clutch, the outer ring of the rotor is formed with a circumferentially extending groove which receives an endless belt for driving the rotor.

SUMMARY OF THE INVENTION

The general aim of the present invention is to provide a new and improved electromagnetic coupling of the foregoing type which is more compact in a radial direction and is lighter in weight than prior couplings having substantially the same torque capability.

A more detailed object is to achieve the foregoing by providing a coupling in which the outer pole ring of the magnet core is disposed radially outwardly of the outer pole ring of the rotor and in which the controlled flux transfer between the core and the outer pole ring of the rotor not only is in a radial direction but also is in an axial direction.

Still another object is to provide a coupling in which the outer pole ring of the magnet core surrounds only part of the outer pole ring of the rotor so as to enable a drive belt to be trained around the unsurrounded part of the latter pole ring.

The invention also resides in the unique J-shaped construction of the magnet core.

These and other objects and advantages of the invention will become more apparent from the following detailed description when taken in conjunction with the accompanying drawings.

DETAILED DESCRIPTION OF THE PREFERRED EMBODIMENT

Figure 1:
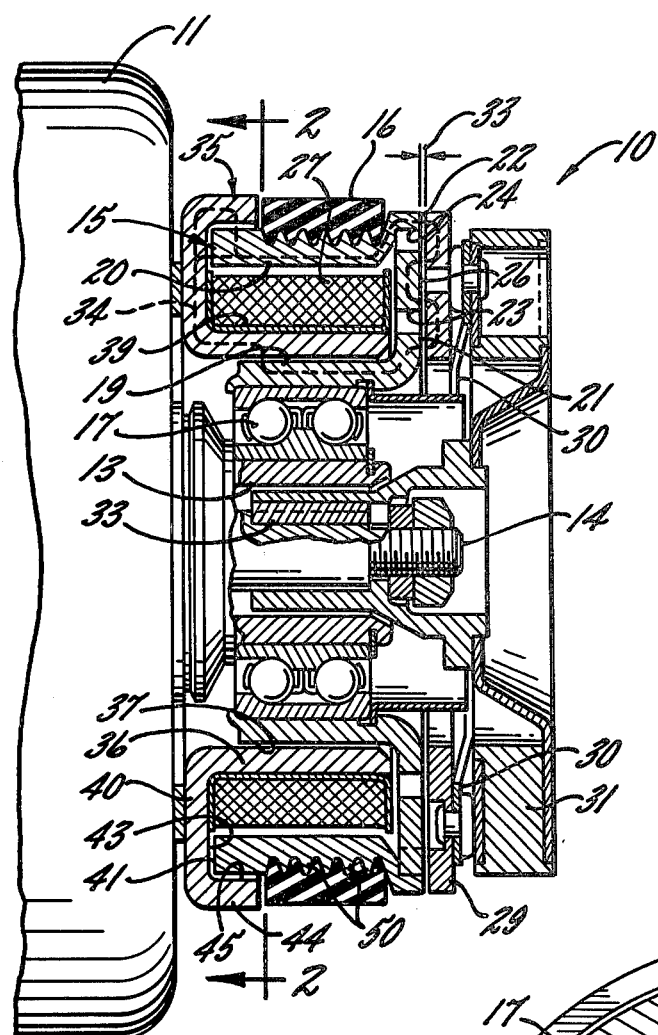
FIG. 1 is a diametrical sectional view of a new and improved electromagnetic coupling incorporating the unique features of the present invention.
Figure 2:
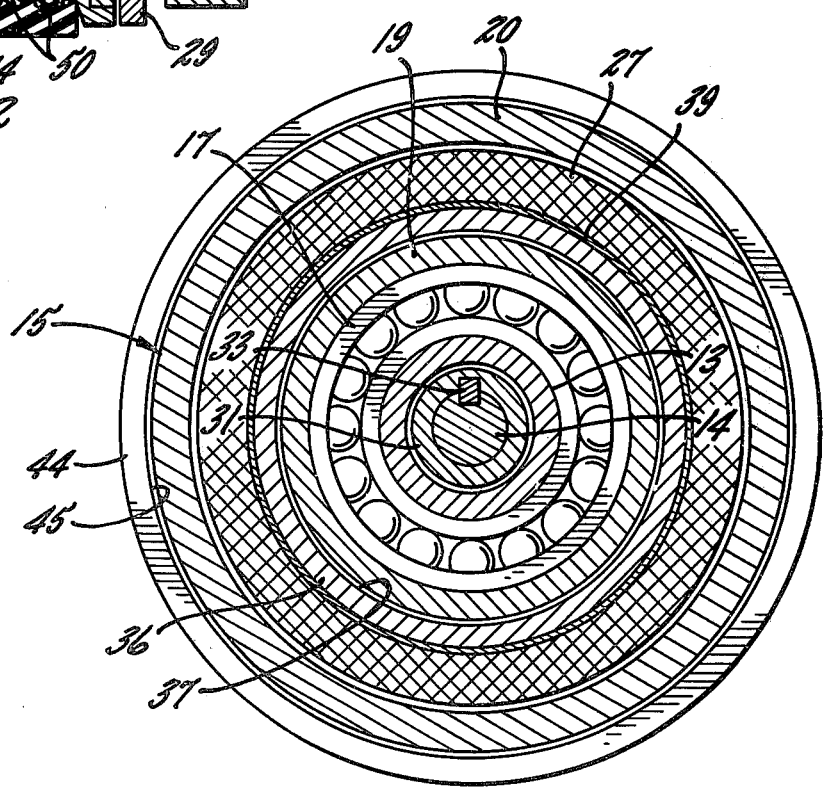
FIG. 2 is a cross-section taken substantially along the line 2—2 of FIG. 1.

As shown in the drawings for purposes of illustration, the invention is embodied in an electromagnetic coupling 10 which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an annular rotor 15 adapted to be driven from the engine of the vehicle by an endless belt 16 and rotatably journaled on the nose 13 of the compressor 11 by a ball bearing 17. The rotor is substantially U-shaped in radial cross-section and includes inner and outer concentric pole rings 19 and 20 made of magnetic material, the inner ring being secured to the outer race of the bearing. Pole faces 21 and 22 are defined by the forward ends of the rings 19 and 20, respectively. The pole faces are magnetically isolated from one another by radially spaced sets 23 and 24 of angularly spaced arcuate slots but are physically connected by an intervening ring 26 located between the two sets of slots.

A multiple turn winding 27 is disposed in a stationary position between the inner and outer pole rings 19 and 20 of the rotor 15. When excited by a voltage source, the winding produces magnetic flux which engages the clutch 10 by drawing an armature 29 into engagement with the pole faces 21 and 22 of the rotor. Herein, the armature is in the form of a circular ring having a series of angularly spaced arcuate slots (not visible in the drawings) located between its inner and outer sides. The armature is connected by a set of angularly spaced leaf springs 30 to a hub assembly 31 which is keyed at 33 to the shaft 14 of the compressor 11. The springs urge the armature to a released position in which the armature is spaced from the pole faces 21 and 22 by a narrow axial air gap 33. Upon excitation of the winding 27, flux threads along a path 34 indicated in dotted lines and cuts across the gap 33 to draw the armature into frictional engagement with the pole faces and thereby couple the armature and the rotor for rotation in unison to effect rotation of the shaft 14.

The flux produced by the winding 27 is transferred between the winding and the rotor 15 by way of a magnet core 35 which is secured in a stationary position to the end of the compressor 11. In accordance with the present invention, the core 35 is of unique shape and is arranged in a unique manner relative to the rotor 15 so as to permit the radial dimension and the weight of the clutch 10 to be reduced while still enabling the clutch to possess substantially the same coupling torque as a physically larger prior clutch having a winding comparable to the present winding 27.

More specifically, the magnet core 35 is substantially J-shaped in radial cross-section and includes an inner pole ring 36 which defines the longer leg of the J. The inner ring 36 is disposed between the winding 27 and the inner ring 19 of the rotor 15 and is separated from the outer side of the inner ring of the rotor by a radial air gap 37. The inner rings 19 and 36 of the rotor 15 and the core 35 are precisely formed and located so that the air gap 37 is of a precisely predetermined width such as, for example, 0.020". An annular channel 39 is secured to the outer side of the ring 36 and defines a seat within which the winding 27 is secured by epoxy or the like.

Formed integrally with the inner ring 36 of the core 35 is a radially extending bridge 40 which is anchored to the end of the compressor 11, the bridge defining the foot of the J. In carrying out the invention, the bridge 40 extends radially beyond the rear end 41 of the outer ring 20 of the rotor 15 and is separated from such end by an axial air gap 43 having a precisely controlled width in the neighborhood of 0.025".

Further in keeping with the invention, the magnet core 35 is formed with an outer pole ring 44 which is disposed radially outwardly of the outer pole ring 20 of the rotor 15 and which surrounds only the rear portion of the pole ring 20. The outer pole ring 44 of the core is formed integrally with the outer end of the bridge 40, defines the shorter leg of the J and is separated from the outer ring 20 of the rotor 15 by a radial air gap 45 which has a precisely controlled width of about 0.020". When the winding 27 is excited, the controlled flux transfer between the core 35 and the rotor 15 occurs radially across the air gap 37 between the inner pole rings 36 and 19, occurs radially across the air gap 45 between the outer pole rings 44 and 20 and also occurs axially across the air gap 43 between the bridge 40 and the rear end 41 of the outer pole ring 20 (see the flux path 34 in FIG. 1).

Because the outer pole ring 44 of the magnet core 35 surrounds only the rear portion of the outer pole ring 20 of the rotor 15, the drive belt 16 may be trained directly around the unsurrounded forward portion of the pole ring 20 and may be located relatively close to the axis of the clutch 10. In the present instance, several axially spaced and circumferentially extending grooves 50 are formed around the outer side of the outer pole ring 20 and receive complementary ribs on the inner side of the belt. The outer pole ring 20 thus defines a pulley for the belt.

With the outer pole ring 20 of the rotor 15 located inwardly of the outer pole ring 44 of the core 35 rather than outwardly thereof, the outer pole ring 20 of the rotor may be located nearer to the axis of the clutch 10 and the pulley grooves 50 may be located inwardly of the outer pole ring 44 of the core. This enables the overall radial dimension and weight of the clutch to be reduced. The outer pole ring 44 of the core 35 is relatively short to enable the drive belt 16 to be trained directly around the forward portion of the outer pole ring 20 of the rotor 15 and, as a result, the overlapping radially facing surfaces of the outer pole rings 20 and 44 are of insufficient axial length to transfer adequate flux across the radial gap 45 for producing the required coupling torque. The flux which is transferred radially across the gap 45 is augmented, however, by the controlled flux which passes axially across the gap 43 between the bridge 40 and the rear end 41 of the outer pole ring 20. Thus, the torque producing capability of the clutch 10 is maintained even though the outer pole 44 of the core 35 is relatively short in length and thus there is no need to increase the axial dimension of the clutch.

We claim:

1. An electromagnetic coupling comprising an annular rotor having inner and outer concentric rings, one end of each of said rings defining a pole face, an armature mounted for rotation relative to said rotor and adapted to be drawn axially toward said pole faces by magnetic flux threading through said rotor and said armature, a stationary magnet core defined by inner and outer radially spaced concentric rings and by a bridge which spans such rings, the inner ring of said core being disposed between the inner and outer rings of said rotor and being spaced radially outwardly from the inner ring of said rotor by a narrow radial air gap of predetermined width, the bridge of said core extending alongside the opposite end of the outer ring of said rotor and being spaced axially from said opposite end by a narrow axial air gap of predetermined width, the outer ring of said core being spaced radially outwardly from the outer ring of said rotor by a narrow radial air gap of predetermined width, and means located between the outer ring of said rotor and the inner ring of said core for producing magnetic flux which threads radially across said radial air gaps and axially across said axial air gap whereby the controlled flux transfer between said core and the outer ring of said rotor occurs both in a radial direction and in an axial direction.

2. An electromagnetic coupling as defined in claim 1 in which said magnet core is substantially J-shaped in radial cross-section, the longer leg of the J extending axially and being defined by the inner ring of said core, the foot of the J extending radially and being defined by said bridge, and the shorter leg of the J extending axially and being defined by the outer ring of said core.

3. An electromagnetic coupling as defined in claim 2 in which the outer surface of the outer ring of said rotor is formed with at least one circumferentially extending groove, said groove being located between the pole face of the outer ring of said rotor and the free end of the shorter leg of said J.

4. An electromagnetic coupling as defined in claim 3 in which said groove is located radially inwardly of the shorter leg of said J.

5. An electromagnetic coupling comprising an annular rotor having inner and outer concentric rings, one end of each of said rings defining a pole face, an armature mounted for rotation relative to said rotor and adapted to be drawn axially toward said pole faces by magnetic flux threading through said rotor and said armature, a stationary magnet core of substantially J-shaped radial cross-section and defined by axial extending inner and outer radially spaced concentric rings and by a radially extending bridge which spans such rings, the inner ring of said core defining the longer leg of the J and being disposed between the inner and outer rings of said rotor, the bridge of said core defining the foot of said J and extending alongside the opposite end of the outer ring of said rotor, the outer ring of said core defining the shorter leg of said J and being located radially outwardly of the outer ring of said rotor, at least one groove extending circumferentially around the outer side of the outer ring of said rotor and adapted to receive a drive belt, said groove being located radially inwardly from the outer side of the outer ring of said core and being located between the pole face of the outer ring of said rotor and the free end of the shorter leg of said J, and means located between the outer ring of said rotor and the inner ring of said core for producing magnetic flux.

6. An electromagnetic coupling as defined in claim 5 in which the inner ring of said core is spaced radially outwardly from the inner ring of said rotor by a narrow radial air gap of predetermined width, the bridge of said core being spaced axially from said opposite end of the outer ring of said rotor by a narrow axial air gap of predetermined width, and the outer ring of said core being spaced radially outwardly from the outer ring of said rotor by a narrow radial air gap of predetermined width whereby said flux threads radially across said radial air gaps and axially across said axial air gap with the controlled flux transfer between said core and the outer ring of said rotor being both in a radial direction and in an axial direction.

* * * * *